United States Patent [19]
Hendrix

[11] Patent Number: 6,008,920
[45] Date of Patent: Dec. 28, 1999

[54] MULTIPLE CHANNEL MULTIPLEXER/ DEMULTIPLEXER DEVICES

[75] Inventor: Karen Denise Hendrix, Santa Rosa, Calif.

[73] Assignee: Optical Coating Laboratory, Inc., Santa Rosa, Calif.

[21] Appl. No.: 09/038,459

[22] Filed: Mar. 11, 1998

[51] Int. Cl.$^6$ .................................................. H04J 14/02
[52] U.S. Cl. ...................... 359/127; 359/633; 359/634; 359/636
[58] Field of Search .................................... 359/127, 129, 359/130–131, 629, 633, 634, 636

[56] References Cited

U.S. PATENT DOCUMENTS

| | | |
|---|---|---|
| 3,829,195 | 8/1974 | Rawson . |
| 4,213,677 | 7/1980 | Sugimoto et al. . |
| 4,244,045 | 1/1981 | Nosu et al. ................................. 370/3 |
| 4,474,424 | 10/1984 | Wagner . |
| 4,479,697 | 10/1984 | Kapany et al. . |
| 4,482,994 | 11/1984 | Ishikawa ..................................... 370/3 |
| 4,550,975 | 11/1985 | Levinson et al. . |
| 4,651,315 | 3/1987 | Laude ......................................... 370/3 |
| 4,867,520 | 9/1989 | Weidel . |
| 5,087,109 | 2/1992 | Ishizuka et al. . |
| 5,331,651 | 7/1994 | Becker et al. . |
| 5,357,589 | 10/1994 | Brown, Jr. et al. . |
| 5,479,547 | 12/1995 | Kunikane et al. . |
| 5,539,577 | 7/1996 | Si et al. . |
| 5,583,683 | 12/1996 | Scobey ................................... 359/127 |
| 5,612,824 | 3/1997 | Si et al. .................................. 359/652 |
| 5,657,155 | 8/1997 | Cheng . |
| 5,737,104 | 4/1998 | Lee et al. ................................ 359/124 |
| 5,808,763 | 9/1998 | Duck et al. ............................. 359/127 |

OTHER PUBLICATIONS

Kingslake, *Lens Design Fundamentals*, Academic Press, Inc., pp. 202–205, 1978.

Khoe et al., Progress in Monomode Optical–Fiber Interconnection Devices, *Journal of Lightwave Technology*, vol. LT–2. No. 3, pp. 217–227, Jun. 1984.

P.D. Atherton, N.K. Reay, J. Ring and T.R. Hicks, "Tunable Febry–Perot Filters," Optical Engineering 20, 806–814 (1981).

H.D. Hendricks, "A Four Channel 10–Nanometer Spacing Wavelength Demultiplexer," Fiber Optics Multiplexing and Modulation; Proceedings of the Meeting, Arlington, VA, Apr. 7, 1983, SPIE 417, 5–11 (1983).

H.D. Hendricks, "Wavelength Division Multiplexing," Fiber Optics Communications Technology; Proceedings of the Meeting, San Diego, CA, Aug. 23–24, 1984, SPIE 512, p. 130–144 (1984).

(List continued on next page.)

*Primary Examiner*—Leslie Pascal
*Attorney, Agent, or Firm*—Workman, Nydegger & Seeley

[57] ABSTRACT

Multiple channel optical multiplexing/demultiplexing devices that utilize only a single constant, non-variable wavelength-selective optical interference filter have many advantages. The wavelength-selective optical filter is a conventional fixed wavelength optical interference filter having an angle shift property wherein the wavelength-selectivity changes with changing angles of incidence upon the filter. Because such filters are transparent to a different center wavelength depending on the angle of incidence of a light beam, multiplexing/demultiplexing is achieved by varying the angle of incidence of the light beam upon a single, constant and non-variable optical interference filter. Many different systems can be designed to transmit a light beam at multiple varied angles of incidence upon a single interference filter. Two such exemplary systems utilize a multiple-reflection chamber adapted to transmit a light beam at successively varied angles of incidence upon a single interference filter.

20 Claims, 9 Drawing Sheets

OTHER PUBLICATIONS

Hideki Ishio, Junichiro Minowa and Kiyoshi Nosu, "Review and Status of Wavelength–Division–Multiplexing Technology and Its Application," Journal of Lightwave Technology, vol. LT–2, No. 4, 448–46 (Aug., 1984).

Kiyoshi Nosu, Kideki Ishio and Kunio Hashimoto, "Multi-reflection Optical Multi/Demultiplexer Using Interference Filters," Electronic Letters 15, 414–415 (1979).

P.H. Lissberger and A.K. Roy, "Narrowband Position Tuned Multilayer Interference Filter for Use in Single–Mode–Fibre Systems," Electronics Letters 21:18, 798–799 (1985).

T. Tanaka, S. Kishi and T. Tsutsumi, "Fiber–Optic Multi-function Devices Using a Single GRIN–Rod Lens for WDM Transmission Systems," Applied Optics, vol. 21, No. 19, 3423–3429 (Oct., 1982).

MULTIPLE CHANNEL MULTIPLEXER/ DEMULTIPLEXER DEVICES

BACKGROUND OF THE INVENTION

1. The Field of the Invention

The present invention is directed to methods and apparatus for providing improved multiple channel multiplexer/demultiplexer devices.

2. The Relevant Technology

Wavelength division multiplexing (WDM) technology has become a vital component of optical communication systems. WDM provides means for multiplexing, i.e., combining, multiple optical sources of different wavelengths, i.e., different optical channels, for coupling into a single optical fiber for simultaneous transmission and means for demultiplexing, i.e., separating, the different wavelengths for detection by optical receivers. In this manner, the communication capacity of a fiber optics system is expanded. Thus, a demultiplexer (DEMUX) device is designed to selectively direct several channels from a single multiple-channel input beam into separate output channels and a multiplexer (MUX) device provides a single multiple-channel output beam comprising the combinations of a plurality of separate input beams. A multiplexer-demultiplexer (MUX/DEMUX) device operates in either the multiplexing or demultiplexing mode depending on its orientation in application, i.e., depending on the choice of direction of the light beam paths through the device. Other related devices necessary for WDM systems are optical fibers, optical sources, and optical detectors.

Applications for MUX/DEMUX technology include long haul communications and local area data networks. Both digital and analog systems have been demonstrated for voice, data and video. This type of technology is also applicable to free space communications using lasers. In spacecraft and aircraft applications, advantageous reductions in weight may be achieved along with increased data handling capacity, and improved routing and fault tolerance capabilities. Multiple sensor data can be optically multiplexed onto a single fiber for remote sensing and/or surveillance. The ability to communicate between high speed data processors, even in free space, would improve utility and interconnectability which could increase computational capabilities. In addition, closed circuit and cable television systems could be expanded and submarine cable systems could be developed. In view of these diverse applications, much effort has been expended toward developing this technology.

These intense efforts have resulted in the development of many types of MUX/DEMUX devices having different advantages and disadvantages. See, e.g., Ishio, H., Minowa, J. and Nosu, K., *Review and Status of Wavelength-Division-Multiplexing Technology and Its Application*, J. Lightwave Technol. 2, 448–463 (1984); Hendricks, H. D., *A four channel 10-nanometer spacing wavelength demultiplexer*, Fiber Optics multiplexing and modulation; Proceedings of Meeting, Arlington, Va., Apr. 7, 1983, SPIE 417, 5–11 (1983); Hendricks, H. D., *Wavelength Division Multiplexing*, Fiber optics communications technology; Proceedings of the Meeting, San Diego, Calif., Aug. 23–24, 1984, SPIE 512, 130144 (1984); Nosu, K., Ishio, K., and Hashimoto, K., *Multireflection optical multi/demultiplexer using interference filters*, Electronic Letters 15, 414–415 (1979); U.S. Pat. No. 4,244,045, issued Jan. 6, 1981, to Nosu, et al.; and U.S. Pat. No. 4,482,994, issued Nov. 13, 1984, to Ishikawa. The entire disclosures of each above-cited reference is hereby incorporated herein by reference. Wavelength selectivity may be achieved with angularly dispersive devices including prisms and various diffractive grating devices, e.g., prism grating devices, linear grating devices, and chirped grating devices. The grating devices may be of the Littrow-type which uses a common lens of either a conventional lens type or a graded index (GRIN) rod lens type. No-lens systems are also known and may have, for example, only a concave grating or a combination of a slab waveguide with a grating device. Wavelength selectivity may also be achieved through the use of the wavelength selective characteristics of optical thin film interference filters. Combinations of grating devices and optical filters are also known.

With respect to multiplexing/demultiplexing multiple optical channels, a simple two-channel multiplex/demultiplexing is achieved with a wavelength-selective optical filter type of MUX/DEMUX device having a narrow band pass (NBP) filter positioned within a first fiber such that a transmitted wavelength continues through the first fiber while a reflected wavelength is directed into a second output fiber. Another type of wavelength-selective optical filter MUX/DEMUX device combines NBP filters and GRIN rod lenses to multiplex/demultiplex multiple optical channels. In these types of devices, a NBP filter is positioned between two GRIN rod lenses and a light beam is introduced into the first GRIN rod lens such that a particular wavelength of the light beam is transmitted through the NBP into the second GRIN rod lens and a remaining wavelength is reflected back through the first GRIN rod lens.

To multiplex/demultiplex more channels, however, requires additional units consisting of an NBP filter positioned between two GRIN rod lenses connected in series such that the output of one unit provides input to another. This serial connection requires a critical off-axis alignment of the components that must be precisely controlled. The larger the number of channels to be separated, the greater the adjustment difficulties of the multiple serially-connected units. Adjustment is typically achieved by carefully setting and cementing the NBP filters at the precise angles to achieve the proper configuration. According to U.S. Pat. No. 5,612,824, issued Mar. 18, 1997, to Si et al., it is also possible to adjust or "tune" the wavelength selectivity of the NBP filter by adjusting the location of the ports for inputting and outputting light and/or by varying the separation of the ports from the axis of the two GRIN rod lenses.

Alternatively, a wavelength-selective optical filter type of MUX/DEMUX device may use a waveguide structure to multiply reflect a light beam through multiple propagating systems, each system consisting of an optically continuous specific wavelength-selective NBP filter, an angled spacer and a collimating lens, i.e., an NBP filter/spacer/lens system. The waveguide structure may be a parallel-sided solid or hollow glass plate that propagates a light beam introduced at some angle in a "zig-zag" pattern between the parallel sides or the waveguide structure may be polygon-shaped such that the light beam is multiply reflected in a "star-shape." The collimating lens may be a GRIN rod lens. Each NBP filter has a different passband wavelength and a different center wavelength and each filter reflects wavelengths sufficiently different from its particular center wavelength. Each NBP filter/spacer/lens system is placed at a position contacting the surface of the common central waveguide where some portion of the propagated light beam will be incident. The light beam is introduced through an input fiber at a desired incident angle, achieved either by the relationship of the polygon sides to each other or by propagation through a collimating lens and a prism spacer. The incident light beam is then propagated, at a constant angle determined by the transmission medium of the waveguide, through the waveguide to the first NBP filter. At the first (and subsequent) NBP filters, a particular wavelength of the incident light beam is transmitted through the NBP filter, the angled spacer and the collimated lens, while the remaining wavelengths are reflected back and propagated at the predetermined constant angle through the waveguide to the opposite side of the waveguide. At this location, there may be a second NBP filter/spacer/lens system or there may be a reflective coating that redirects the beam back to the other side of the waveguide to the second NBP filter/spacer/lens system. In either case, at the second NBP, again, a particular wavelength of the incident light beam is transmitted through the NBP while the remaining wavelengths are reflected (or multiply reflected) to the third NBP, etc. The particular wavelength that passes through each NBP filter is focused by the collimating lens before entering a detector or an output fiber for travel to the detector. In this manner, multiple optical channels can be multiplexed/demultiplexed.

Because of the need for separate different NBP filters, these types of devices are technically challenging, time-consuming and relatively costly to produce. The individual NBP filters may be deposited upon separate substrates and then assembled together or may be deposited directly on another component of the system such as the spacer components. The challenge of producing NBP filters having very exact desired wavelength selectivities is significantly increased as the number of such different filters required for a single MUX/DEMUX device increases. In addition, the center wavelength of a NBP filter is a function of the angle of incidence of the input light beam. See, e.g, Atherton, P. D., Reay, N. K., Ring, J., and Hicks, T. R., *Tunable Fabry-Perot Filters*, Optical Engineering 20, 806–814 (1981), the entire disclosure of which is hereby incorporated by reference. This characteristic permits the NBP filter to be "tilt-tuned" to achieve fine adjustments of the center wavelengths but also makes it critical for successful operation of these types of devices that the juxtaposition of the separate, different NBP filters be precisely and rigidly maintained. A parallel-sided solid block or polygon-shaped glass block is useful because it permits the individual filters to be "tilt-tuned" and cemented into position with relative ease.

In the absence of a solid block, however, other means for maintaining the required precise juxtaposition of the individual NBP filters must be used. This requirement also increases the difficulty and cost of producing such devices. In addition, the multiple components of these systems, i.e., optical fibers, lenses, filters, spacers, waveguides, detectors, etc. must all be precisely aligned for proper operation. This requirement makes for challenging and costly production. Moreover, as mentioned above, adhesives are often used to form continuous optical elements from the various components and thereby avoid the disruption of transmitting through air or another interspersed medium, however, the adhesive layers themselves contribute some degree of degradation of transmission.

Another type of NBP filter that is "position-tunable" is constructed with the film thickness being continuously varied across the filter aperture. See, e.g., Lissberger, P. H. and Roy, A. K., *Narrowband position tuned multilayer interference filter for use in single-mode-fibre systems*, Electronics Letters 21:18, 798–799 (1985), the entire disclosure of which is hereby incorporated herein by reference. U.S. Pat. No. 5,583,683, issued to Scobey on Dec. 10, 1996, the entire disclosure of which is hereby incorporated herein by reference, discloses using such linear variable filters in MUX/DEMUX devices. The devices utilize a parallel-sided optical block to propagate a light beam in a "zig-zag" pattern onto multiple ports. The light beam is incident at the same "bounce" angle at each port, however, because the NBP filter has variable thickness, a different particular wavelength is transmitted at each port and the remaining wavelengths are reflected or multiply reflected to the next port and a portion of the NBP filter having a different thickness and, thus, a different wavelength selectivity. Because the deposition process to produce variable thickness NBP filters requires very precise control, these filters are challenging and costly to produce. In addition, construction is complicated by the need to ensure that the desired center wavelength is achieved at the precise locations where the light beam will be incident in accord with the constant bounce angle through the optical block. Alternatively, alignment is achieved with careful control of other components, i.e., spacers and lenses. Any inconstancy in the bounce angle would make this alignment even more difficult to achieve.

In view of the foregoing, it would be an advance to provide methods and apparatus for multiplexing/demultiplexing multiple channels through the use of only a single, fixed thickness, wavelength-selective optical filter in a MUX/DEMUX device. In this manner, great time and cost savings are realized because the need for the production of multiple separate and different NBP filters or sophisticated linear variable NBP filters is eliminated. In addition, the difficulties of precisely tuning multiple, separate and different NBP filters is also eliminated. The configuration and operation of such MUX/DEMUX devices would be much simpler and more reliable and would further advantageously require fewer, if any, additional components, i.e., spacers and additional and/or multiple, separate substrates, for achieving and maintaining a precise alignment of multiple, separate and different NBP filters. Such methods and devices are described and claimed herein.

SUMMARY AND OBJECTS OF THE INVENTION

It is a primary object of the present invention to provide methods and apparatus for multiplexing/demultiplexing multiple optical channels through the use of only a single, fixed thickness, wavelength-selective optical filter in a MUX/DEMUX device.

It is another object of the present invention to provide methods for producing MUX/DEMUX devices capable of multiplexing/demultiplexing multiple optical channels through a single, fixed thickness, wavelength-selective filter that are relatively faster, easier, and less costly to produce than conventional optical filter MUX/DEMUX devices.

Yet another object of the present invention is to provide MUX/DEMUX devices capable of multiplexing/demultiplexing multiple optical channels through a single, fixed thickness, wavelength-selective filter that are simple and highly reliable to produce and operate because the difficulties of precisely tuning and achieving and maintaining precise relative alignment of multiple, separate and different NBP filters are eliminated.

These and other objects and advantages of the invention will be better understood by reference to the detailed description, or will be appreciated by the practice of the invention.

To achieve the foregoing objects, and in accordance with the invention as embodied and broadly described herein, the present invention provides methods and apparatus for multiplexing/demultiplexing multiple channels through the use of only a single, fixed thickness, wavelength-selective optical interference filter in a MUX/DEMUX device. The single, fixed thickness, wavelength-selective optical filters used in accord with the present invention are conventional optical interference filters having a fixed thickness in accord with the wavelength-selective optical design. As used herein, the phrase "fixed thickness" refers to a uniform thickness and, thus, fixed thickness filters differ from "variable thickness" filters that achieve wavelength-selectivity by virtue of the varying thickness of the filter at different locations. Accordingly, as used herein, the phrase "fixed thickness" refers to optical filters having a constant, i.e., non-variable, wavelength selectivity. Because optical interference filters are transparent to a different center wavelength depending on the angle of incidence of a light beam, multiplexing/demultiplexing is achieved by varying the incidence of the light beam upon a single, fixed thickness, i.e., constant and non-variable, optical interference filter. Persons of skill in the art will appreciate that all types of interference filters, e.g., narrow bandpass, long-wavelength-pass and/or short-wavelength pass, may be utilized so long as the necessary angle shift property wherein the wavelength-selectivity changes with angle of incidence is present.

The wavelength-selective optical filter in accord with the present invention is preferably a narrow bandpass (NBP) filter and, most preferably, a multiple-cavity NBP filter. Persons of skill in the art will appreciate that many different systems can be designed to transmit a light beam at multiple and varied angles of incidence upon a single NBP filter. Exemplary systems are described herein but these are to be considered illustrative and not limiting. One exemplary system utilizes a multiple-reflection chamber adapted to effect reflection of an incident light beam at successively varied angles and a single NBP filter positioned to be successively impinged by the successively reflected light at different incident angles. A second exemplary system utilizes a plurality of faceted prisms formed on, or otherwise optically continuous with, at least one light-interacting surface of an optical block to effect reflection of an incident light beam at successively varied angles within the block and a single NBP filter positioned to be successively impinged by the successively reflected light at different incident angles.

In one preferred embodiment, a multiple-reflection chamber comprising a wedge-shaped optical block, having one or both light-interacting surfaces optically continuous with a constant i.e., non-variable, NBP filter, achieves multiplexing/demultiplexing of multiple optical channels. The wedge-shape of the optical block results in a continuously varying bounce angle of a multiply reflected light beam traversing the optical block. The particular bounce angle is determined by factors unrelated to the NBP filter and, thus, is more easily and reliably controlled than factors related to the alignment and thickness of the NBP filter itself. In particular, the continuously variable bounce angle has two components: a constant component determined by the angle of incidence of the inputted light and the material of the optical block; and, a sequentially additive component determined by the wedge angle of the optical block. Because the constant, non-variable NBP filter is transparent to a different center wavelength depending on the angle of incidence of the light beam, a different particular wavelength is transmitted through the NBP filter at each location where a differently angled light beam is incident. In this manner, multiple optical channels are multiplexed/demultiplexed through a single, constant NBP filter.

A second preferred embodiment type employs a parallel-sided optical block having wedged facets formed on, or otherwise optically continuous with, at least one light-interacting surface and having one or both light-interacting sides coated with a constant, i.e., non-variable, NBP filter, to achieve multiplexing/demultiplexing of multiple optical channels. The wedged facets on the optical block propagate light at varying bounce angles, each bounce angle determined by the angle of incidence of the inputted light, the material of the optical block and the wedge angle of the facet. Because the constant, non-variable NBP filter is transparent to a different center wavelength depending on the angle of incidence of the light beam, a different particular wavelength is transmitted through the NBP filter at each location where a differently angled light beam is incident. In this manner, multiple optical channels are multiplexed/demultiplexed through a single, constant NBP filter.

Persons of skill in the art will appreciate that the angle of incidence upon the NBP filter and the position of the ports for inputting or outputting light beams (depending on whether the device is operating in multiplexing or demultiplexing mode) can be selectively controlled and adjusted by appropriate selection of the optical block material as well as the wedge angle of either the optical block or the facets. In addition, the input angle of the multiple channel light beam for demultiplexing, or the multiple light beams for multiplexing, can be easily selectively adjusted.

BRIEF DESCRIPTION OF THE DRAWINGS

In order that the manner in which the above-recited and other advantages and objects of the invention are obtained, a more particular description of the invention briefly described above will be rendered by reference to specific embodiments thereof illustrated in the appended drawings. Understanding that these drawings depict only typical embodiments of the invention and are not therefore to be considered limiting of its scope, the invention will be described and explained with additional specificity and detail through the use of the accompanying drawings in which.

DESCRIPTION OF THE PREFERRED EMBODIMENTS

Figure 1:
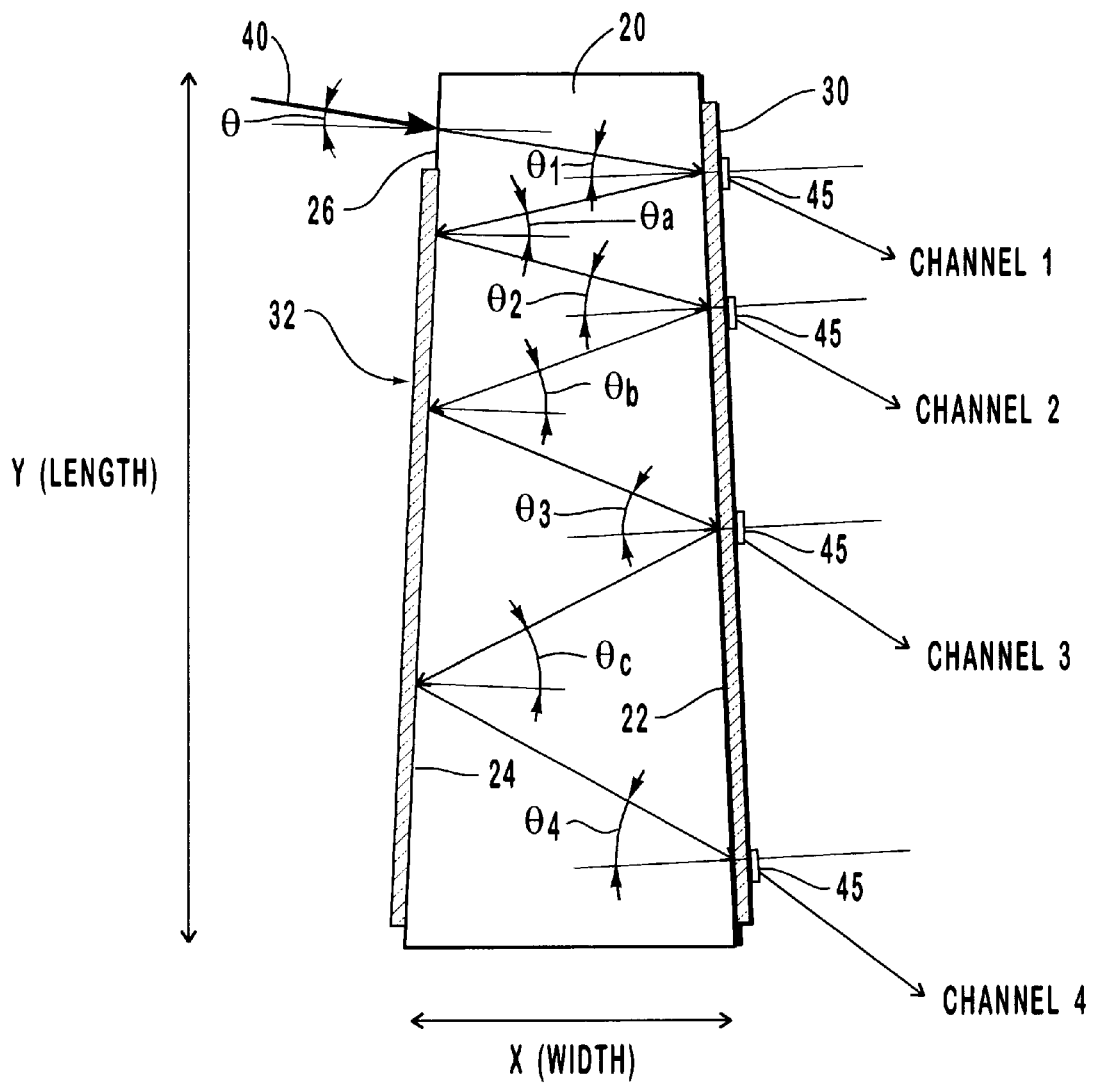
FIG. 1 is a schematic cross-section illustration of a first preferred embodiment of an optical multiplexing/demultiplexing device in accord with the present invention having the capability of multiplexing/demultiplexing four optical channels.

The present invention is directed to methods and apparatus for providing improved multiple channel multiplexer/demultiplexer devices. An optical demultiplexer device "demultiplexes," i.e., spatially disburses collimated multiple wavelength light from a fiber optic waveguide or other optical source, such as a laser, into the separate and different wavelength bands, each of which can be directed to an individual fiber optic waveguide output, a photodetector, or other destination. An optical multiplexer device combines separate and different wavelength bands from individual optical sources into a multiple wavelength light beam for simultaneous transmission through a common fiber optic waveguide or other communication system component.

Multiplexer/demultiplexer (MUX/DEMUX) devices can operate in either or both directions depending on the direction of travel of light directed through the device. Although, for simplicity and convenience, the demultiplexing functionality is predominantly focused upon in the examples below, it will be appreciated that this focus is not to be construed as limiting. Persons of skill in the art will appreciate that the correlative multiplexing functionality is readily achieved by reversing the direction of operation such that separate channels are combined to form a multiple channel signal. As used herein, the term "multiple-channel propagation port" refers to a port for simultaneously propagating multiple optical channels and the term "selected-channel propagation port" refers to a port for propagating a sub-range of wavelengths included within the multiple optical channel wavelengths. It will be appreciated that the multiple-channel propagation port will be an input port for purposes of demultiplexing and will be an output port for purposes of multiplexing separately propagated selected channels. Similarly, the selected-channel propagation ports will be input ports for multiplexing purposes and will be output ports for channels that have been demultiplexed.

In addition, although not described in detail, persons of skill in the art will understand that the optical connections i.e. the light source(s), couplers. collimating and/or other lenses, detectors and/or other receivers, are included in a communication system comprising the MUX/DFMUX devices as disclosed herein. Typically, the input and output light beams are conveyed in optical fibers which are connected to the MUX/DEMUX device via GRIN lenses. The GRIN lenses are selected to refract light from a fiber end to a parallel beam or to focus a parallel beam of light onto the end of a fiber.

The present invention provides methods and apparatus for multiplexing/demultiplexing multiple channels through the use of only a single constant, non-variable wavelength-selective optical interference filter in a MUX/DEMUX device. In this manner, great time and cost savings are realized because the need for the production of multiple, separate and different NBP filters or for very carefully constructed linear variable NBP filters is eliminated. In addition, the difficulties of precisely tuning multiple, separate and different NBP filters is also eliminated. The methods and apparatus in accord with the present invention provides MUX/DEMUX devices having simpler construction and more reliable performance than conventional devices.

The present invention provides methods and apparatus for transmitting a light beam at multiple and varied angles of incidence upon a single NBP filter. Exemplary systems are described herein but these are to be considered illustrative and not limiting.

One exemplary system utilizes a multiple-reflection chamber adapted to effect reflection of an incident light beam at successively varied angles and a single NBP filter positioned to be successively impinged by the successively reflected light at different incident angles. A second exemplary system utilizes a plurality of faceted prisms formed on, or otherwise optically continuous with, at least one light-interacting surface of an optical block to effect reflection of an incident light beam at successively varied angles within the block and a single NBP filter positioned to be successively impinged by the successively reflected light at different incident angles.

In one preferred embodiment, a multiple-reflection chamber comprising a wedge-shaped optical block, having one or both light-interacting surfaces optically continuous with a constant i.e., non-variable, NBP filter, achieves multiplexing/demultiplexing of multiple optical channels. The wedge-shape of the optical block results in a continuously varying bounce angle of a multiply reflected light beam traversing the optical block. The particular bounce angle is determined by factors unrelated to the NBP filter and, thus, is more easily and reliably controlled than factors related to the alignment and thickness of the NBP filter itself. In particular, the continuously variable bounce angle has two components: a constant component determined by the angle of incidence of the inputted light and the material of the optical block; and, a sequentially additive component determined by the wedge angle of the optical block. Because the constant, non-variable NBP filter is transparent to a different center wavelength depending on the angle of incidence of the light beam, a different particular wavelength is transmitted through the NBP filter at each location where a differently angled light beam is incident. In this manner, multiple optical channels are multiplexed/demultiplexed through a single, constant NBP filter.

Persons of skill in the art will appreciate that the wedge-shaped optical block could be constructed in many different ways. For example, a single solid wedge-shaped block can be used or, if desired, the optical block could be formed as a wedge-shaped enclosed chamber which is hollow, meaning either evacuated or filled with air or other optically transparent medium. The wedge-shape may be formed from two half-wedges or partial-wedges adhered together or from two parallel-sided blocks having a wedge-shaped bond or cement joint or a wedge-shaped spacer positioned in between the two parallel-sided blocks. The wedge-shape may be straight on one side and angled on the other, may have both sides equally angled, or may have unequally angled sides.

It will be appreciated that only one side of the wedge-shaped block may have a NBP filter deposited thereon, in which case the opposite side is coated with a reflective coating (except for the location of the multiple-channel propagation port for inputting or outputting, respectively, a multiple optical channel signal for demultiplexing or a multiplexed signal obtained from multiple selected-channel inputs). In this configuration, all multiplexing/demultiplexing occurs at the multiple selected-channel propagation ports on the wedge surface coated, or otherwise optically aligned, with the NBP filter. Optionally, both sides of the wedge-shaped optical block may be coated, or otherwise optically aligned, with a NBP filter (except, again, for the location of the multiple-channel propagation port) and multiplexing/demultiplexing can occur at multiple selected-channel propagation ports on both sides of the device. For this configuration, each of two component blocks, i.e., half-wedge or other partial-wedge shapes to be assembled together, or two parallel-sided blocks to be assembled with a wedge connection, could have the NBP filter simultaneously deposited onto one surface prior to assembly into the wedge-shaped optical block. In this manner, time and cost savings are realized and reliable performance is achieved.

A second exemplary system utilizes a plurality of faceted prisms formed on, or otherwise optically continuous with, at least one light-interacting surface of an optical block to effect reflection of an incident light beam at successively varied angles within the block and a single NBP filter positioned to be successively impinged by the successively reflected light at different incident angles. The wedged facets on the optical block reflect light at varying bounce angles, each bounce angle determined by the angle of incidence of the inputted light, the material of the optical block and the wedge angle of the facet. Because the constant, non-variable NBP filter is transparent to a different center wavelength depending on the angle of incidence of the light beam, a different particular wavelength is transmitted through the NBP filter at each location where a differently angled light beam is incident. In this manner, multiple optical channels are multiplexed/demultiplexed through a single, constant NBP filter.

In this second preferred embodiment, a multiple-reflection chamber comprising a substantially parallel-sided optical block having wedged facets at the locations where internally reflected light impinges one or both of the light-interacting surfaces of the block and having one or both of the light-interacting surface optically continuous with a constant i.e., non-variable, NBP filter, achieves multiplexing/demultiplexing of multiple optical channels. For example, one or both of the surfaces of the multiple-reflection cavity may be faceted with each facet a miniature prism to direct the reflected light beam. The facets may be large with respect to the breadth of the propagating beam so as to perform as prism or wedge faces or they may be small with respect to the breadth of the propagating beam such that a diffractive effect is utilized. The wedged facets result in a continuously varying bounce angle of the multiply reflected light beam traversing the optical block. The particular bounce angle is determined by factors unrelated to the NBP filter and, thus, is more easily and reliably controlled than factors related to the alignment and thickness of the NBP filter itself. In particular, the continuously variable bounce angle has two components: a constant component determined by the angle of incidence of the inputted light and the material of the optical block; and, a variable additive component determined by the wedge angle of each facet.

Because the constant, non-variable NBP filter is transparent to a different center wavelength depending on the angle of incidence of the light beam, a different particular wavelength is transmitted through the NBP filter at each location where a differently angled light beam is incident. In this manner, multiple optical channels are multiplexed/demultiplexed through a single, constant NBP filter.

Persons of skill in the art will appreciate that the parallel-sided optical block having wedged facets formed on, or otherwise optically continuous with, at least one light-interacting surface could be constructed in many different ways. For example, a single solid optical block can be used or, if desired, the optical block could be formed as an enclosed chamber which is hollow, meaning either evacuated or filled with air or other optically transparent medium. The wedged facets may be formed upon the desired surface or surfaces of the optical block or separate wedge-shaped prisms may be adhered to, or otherwise made optically continuous with, the surface or surfaces.

It will be appreciated that only one side of the optical block may have a NBP filter deposited thereon, in which case the opposite side is coated with a reflective coating (except for the location of the multiple-channel propagation port for inputting or outputting, respectively, a multiple optical channel signal for demultiplexing or a multiplexed signal obtained from multiple selected-channel inputs). In this configuration, all multiplexing/demultiplexing occurs at the multiple selected-channel propagation ports on the wedge surface coated, or otherwise optically aligned, with the NBP filter. Optionally, both sides of the optical block may be coated, or otherwise optically aligned, with a NBP filter (except, again, for the location of the multiple-channel propagation port) and multiplexing/demultiplexing can occur at multiple selected-channel propagation ports on both sides of the device.

An important advantage of the present invention is that the angle of incidence upon the optical block and the position of the ports for inputting or outputting light beams (depending on whether the device is operating in multiplexing or demultiplexing mode) can be selectively controlled and adjusted by appropriate selection of the optical block material and the wedge angle of either the optical block or the wedged facets. In addition, the input angle of the multiple channel light beam for demultiplexing, or the multiple light beams for multiplexing, can be easily selectively adjusted.

The wavelength-selective optical filters used in accord with the present invention are conventional fixed wavelength optical interference filters. The single, fixed thickness, wavelength-selective optical filters used in accord with the present invention are conventional optical interference filters having a fixed thickness in accord with the wavelength-selective optical design. As used herein, the phrase "fixed thickness" refers to a uniform thickness and, thus, fixed thickness filters differ from "variable thickness" filters that achieve wavelength-selectivity by virtue of the varying thickness of the filter at different locations. Accordingly, as used herein, the phrase "fixed thickness" refers to optical filters having a constant, i.e., non-variable, wavelength selectivity. Because optical interference filters are transparent to a different center wavelength depending on the angle of incidence of a light beam, multiplexing/demultiplexing is achieved by varying the incidence of the light beam upon a single, fixed thickness, i.e., constant and non-variable, optical interference filter.

Persons of skill in the art will appreciate that all types of interference filters, e.g., narrow bandpass, long-wavelengthpass and/or short-wavelength pass, may be utilized so long as the necessary angle shift property wherein the wavelength-selectivity changes with angle of incidence is present. Such filters are prepared by any of the commercially known methods of multilayer thin film coating manufacture including plasma deposition techniques, such as ion assisted electron beam evaporation, ion beam sputtering, and reactive magnetron sputtering. These known coating methods can produce interference filters constructed of stacked high and low refractive index dielectric materials including metal oxide materials such as niobia and silica. These filters are advantageously dense and stable, with low film scatter and low absorption, as well as low sensitivity to temperature changes and ambient humidity. If desired, reflective and antireflective coatings may also be used in devices in accord with the present invention. All of the optical coatings contemplated are well-known in the art.

As mentioned, all types of optical interference filters may be utilized because these provide the necessary angle shift property wherein the wavelength-selectivity changes with angle of incidence. The presently preferred wavelength-selective optical filter in accord with the present invention is a narrow bandpass (NBP) filter and, most preferably, a multiple-cavity NBP filter. Multiple-cavity interference filters comprise two dielectric thin film stacks which, by themselves, reflect the optical wavelengths in question, separated by a thicker cavity layer. This structure, i.e., dielectric thin film stack-thicker cavity layer-dielectric thin film stack, is repeated one or more times to produce a filter having enhanced optical properties including improved blocking and improved transmission of the "in-band," i.e., selected, wavelength. These filters typically comprise two materials, one of a high refractive index and one of a low refractive index. The low refractive index material is typically silica having a refractive index of about 1.43 at 1.5 $\mu$m (micrometers) wavelength. The high refractive index material is commonly niobium pentoxide, titanium dioxide, tantalum pentoxide and/or mixtures thereof. At 1.5 $\mu$m wavelength, the refractive index for these materials is roughly 2.1 to 2.3.

A schematic cross-section of a first preferred embodiment of an optical multiplexing/demultiplexing device in accord with the present invention having the capability of multiplexing/demultiplexing four optical channels is illustrated in FIG. 1. A wedge-shaped optical block 20, i.e., a block having a varying thickness "X" along its length "Y," provides the multiple-reflection chamber for multiply reflecting a light beam upon a single, continuous, wavelength-selective optical filter 30 optically aligned with one surface 22 of the optical block. As used herein, the phrase "optically aligned with" with respect to optical coatings and specific surfaces refers to optical coatings that are deposited directly upon the specifically-referenced surface or that are deposited onto a substrate that is subsequently aligned with the specifically-referenced surface in an optically continuous manner. Accordingly, the continuous, wavelength-selective optical filter 30 may be deposited directly upon the surface of the optical block or may be deposited upon a substrate that is subsequently affixed to the surface of the optical block in an optically continuous manner. The opposite surface 24 of the optical block 20 is optically aligned with a reflective coating 32 except for a small area that serves as the multiple-channel propagation port 26 for an incident light beam 40 to be demultiplexed. (In demultiplexing mode, this port is the input port while, in a multiplexing mode, this port would be the output port for the multiplexed channels.)

Persons of skill in the art will appreciate that this multiple-channel propagation port 26 may be uncoated, as shown, or may, if desired, be optically aligned with an antireflective coating. The reflective coating 32 may be continuous or may be multiple discrete elements. The reflective coating also may be deposited directly upon the surface of the optical block or may be deposited upon a substrate or multiple substrates and subsequently affixed to the surface of the optical block in an optically continuous manner.

In the illustrated embodiment of FIG. 1, all multiplexing/demultiplexing occurs on the surface 22 optically aligned with the wavelength-selective filter 30. In all of the Figures, an arrow or arrows indicate the pathway of the light beam in the demultiplexing mode of operation of the device. The angle $\theta$ of the incident light beam is a function of the material of the optical block and the angle of entry from the optical source such as an optical fiber. Because of the angled wedge-shape of the optical block, each sequentially reflected light beam strikes the wavelength-selective filter 30 at a different incident angle, $\theta_1$, $\theta_2$, $\theta_3$, and $\theta_4$, respectively. The light beam is sequentially reflected from the reflective coating 32 at the different incident angles, $\theta_a$, $\theta_b$, and $\theta_c$. Thus, the wedge-shaped optical block results in a continuously varying bounce angle of the multiply reflected light beam. In particular, the continuously variable bounce angle has a constant component determined by the angle of incidence of the incident light beam and a sequentially additive component determined by the wedge angle of the optical block due to the continuously varying thickness "X." Because the continuous wavelength-selective optical filter 30 is transparent to a different center wavelength depending on the angle of incidence of the light beam, a different particular wavelength is transmitted through a plurality of separate selected-channel propagation ports 45 optically aligned with the filter at each location where a differently angled light beam is incident. The thickness "X" and length "Y" of the optical block can be selected to achieve the most compact size that permits the desired number of channels to be multiplexed/demultiplexed.

A particular exemplary embodiment in accord with FIG. 1 utilizes a solid glass wedge-shaped optical block for the multiple-reflection chamber. The relationships between the incident angle and the exit angle of the transmitted wavelength is determined by Snell's law and is a function of the refractive indices of the interfacing materials. The incident medium in this example is air having a refractive index of unity. The NBP filter is a 67-layer, 5-cavity design depicted as follows: H' L' H' (LH)$^2$ 14L (HL)$^5$ H 14L (HL)$^6$ H 14L (HL)$^6$ H 14L (HL)$^5$ H 14L (HL)$^2$ H' L' H', where H and L represent quarter wavelength optically thick layers of the high and low index layers for light incident at 9.9° in the 1.45 index medium at the wavelength of 862 nanometers. Prefixes indicate multiple quarter-wave layers; superscripts indicate repeated layers or groups of layers; and, H' and L' are fractional layers with H'=0.398H and L'=0.192L. The high and low index layers are composed of tantalum and silicon oxides, respectively, with refractive indices of approximately 2.14 and 1.45 in the relevant spectral region. The glass block has a refractive index of 1.45 at the wavelength of 862 nanometers and may, for example, be composed of fused silica. The wedge angle is 1.55°. The incident light beam, comprising multiple optical channels, enters the glass block at an angle of 14.4° ($\theta$) and is refracted to a smaller angle inside the block to be incident on the opposite surface at an angle of 9.9° ($\theta_1$); angle $\theta_a$ is 11.45° (9.9+1.55); angle $\theta_2$ is 13.0°; angle $\theta_b$ is 14.55; angle $\theta_3$ is 16.1°; angle $\theta_c$ is 17.65°; and angle $\theta_4$ is 19.2°.

Figure 2:
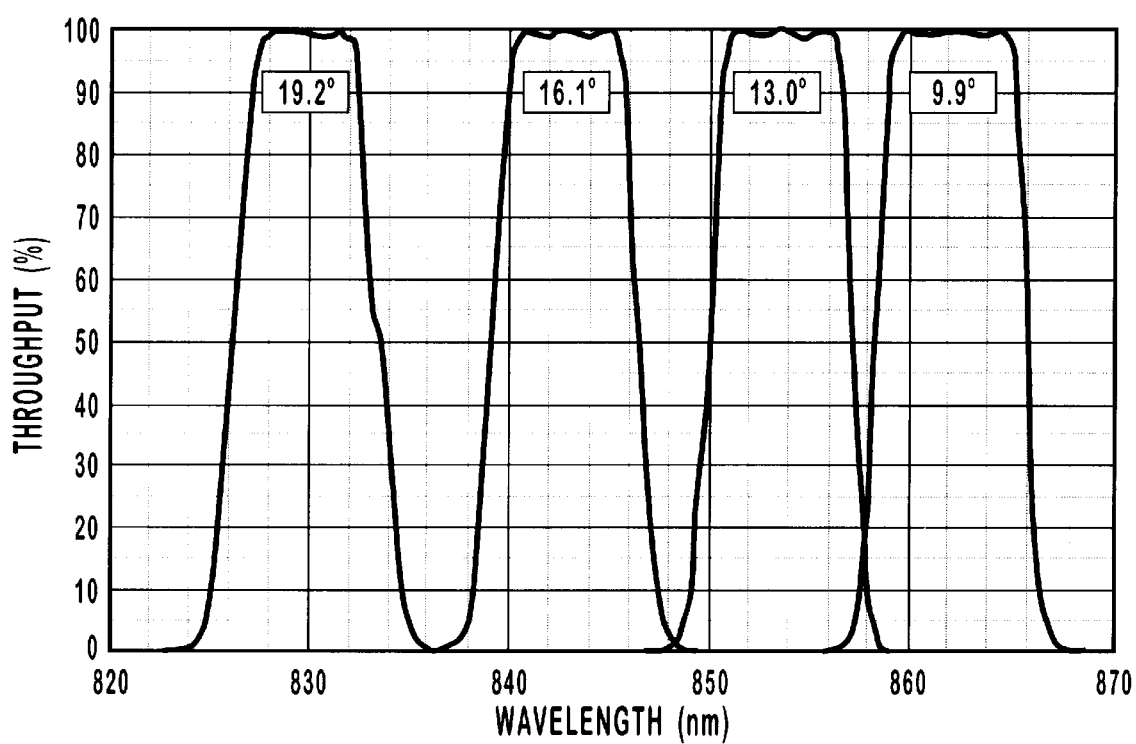
FIG. 2 is a graph of the spectral transmittance of a particular NBP filter for light at different incident angles in a medium of refractive index 1.45 in accord with a preferred embodiment of the present invention as shown in FIG. 1.

FIG. 2 is a graph of the spectral transmittance of the above-described NBP filter for light incident angles in accord with a preferred embodiment of the present invention as shown in FIG. 1 having the above-described parameters. The single, continuous NBP filter provides excellent separation of four channels having center wavelengths of 862, 853.5, 842.7, and 829.8 nanometers.

Figure 3:
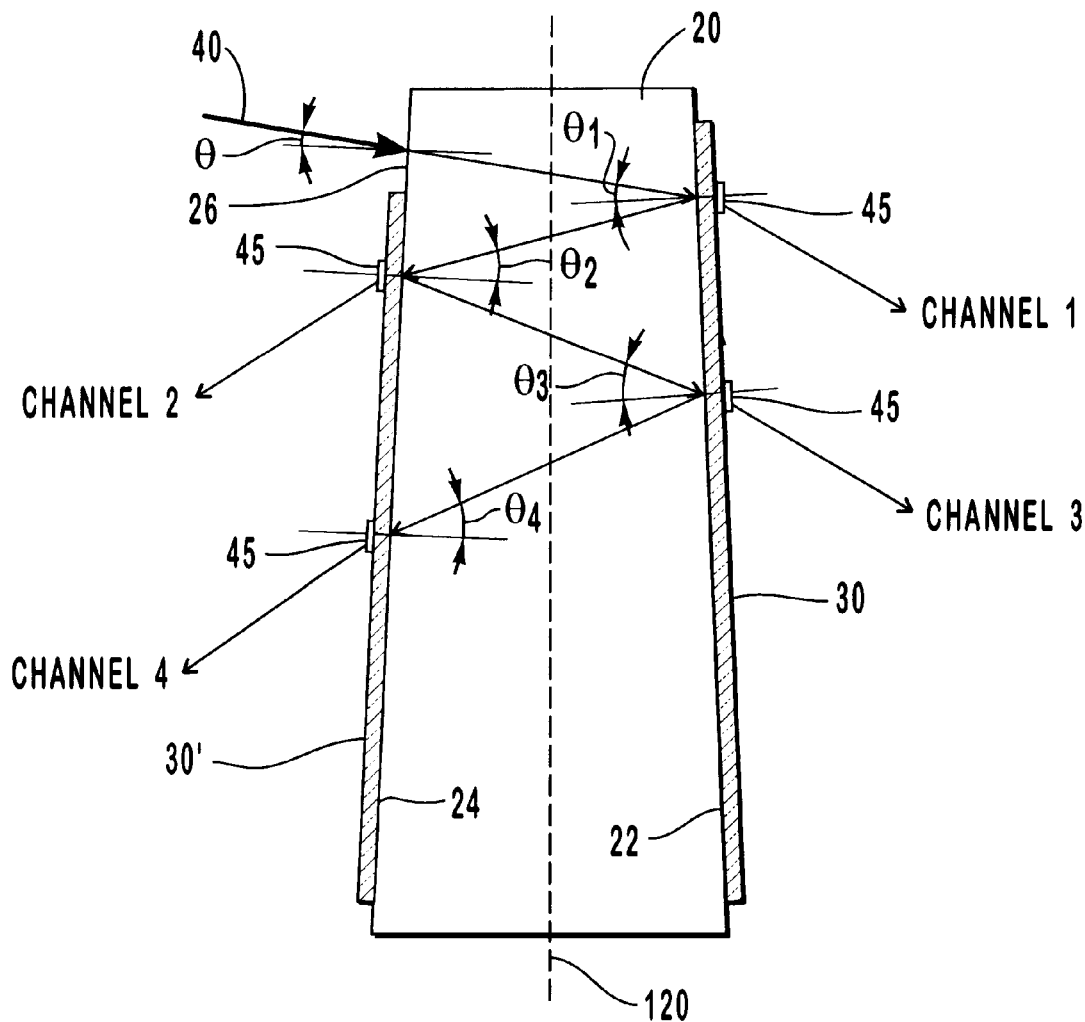
FIG. 3 is a schematic cross-section illustration of an alternative preferred embodiment of an optical multiplexing/demultiplexing device in accord with the present invention having the capability of multiplexing/demultiplexing four optical channels.

A schematic cross-section of a preferred alternative embodiment of an optical multiplexing/demultiplexing device in accord with the present invention having the capability of multiplexing/demultiplexing four optical channels is illustrated in FIG. 3. This device is very similar to the device shown in FIG. 1 and identical reference numbers have been used for the identical components. Again, a wedge-shaped optical block 20, i.e., a block having a varying thickness "X" along its length "Y," is utilized to provide the multiple-reflection chamber for multiply reflecting a light beam. In this embodiment, however, each surface, 22 and 24, of the optical block is optically aligned with a single, continuous, wavelength-selective optical filter, 30 and 30', respectively. Again, a small area on surface 24 serves as the multiple-channel propagation port 26 for an incident light beam 40 to be demultiplexed. Persons of skill in the art will appreciate that this multiple-channel propagation port 26 may be uncoated, as shown, or may, if desired, be optically aligned with an antireflective coating.

Each of the continuous, wavelength-selective optical filters may be deposited directly upon the surface of the optical block or may be deposited upon a substrate that is subsequently affixed to the surface of the optical block in an optically continuous manner. Alternatively, as described above, two component blocks, i.e., half-wedge or other partial-wedge shapes to be assembled together, or two parallel-sided blocks to be assembled with a wedge connection, could have the NBP filter simultaneously deposited onto one surface prior to assembly into the wedge-shaped optical block. As shown in FIG. 3, two half-wedge blocks could be simultaneously coated with identical continuous, wavelength-selective optical filters and then assembled together to form the optical block 20 as indicated by the dotted line 120 through the center of the optical block 20.

In the illustrated embodiment of FIG. 3, multiplexing/demultiplexing occurs on each surface 22 and 24. The angle θ of the incident light beam is a function of the material of the optical block and the angle of entry from the optical source such as an optical fiber. Because of the angled wedge-shape of the optical block, each sequentially reflected light beam strikes the wavelength-selective filters, 30 and 30', at a different incident angle, $\theta_1$, $\theta_2$, $\theta_3$, and $\theta_4$, respectively. Because the continuous wavelength-selective optical filters, 30 and 30', arc transparent to a different center wavelength depending on the angle of incidence of the light beam, a different particular wavelength is transmitted through a plurality of separate selected-channel propagation ports 45 optically aligned with the filters at each location where a differently angled light beam is incident.

A particular exemplary embodiment in accord with FIG. 3 utilizes a solid glass wedge-shaped optical block for the multiple-reflection chamber. The relationships between the incident angle and the exit angle of the transmitted wavelength is determined by Snell's law and is a function of the refractive indices of the interfacing materials. The incident medium in this example is air having a refractive index of unity. The NBP filters are each a 67-layer, 5-cavity design depicted as follows: H' L' H' (LH)$^2$ 14L (HL)$^5$ H 14L (HL)$^6$ H 14L (HL)$^6$ H 14L (HL)$^5$ H 14L (HL)$^2$ H' L' H', where H and L represent quarter wavelength optically thick layers of the high and low index layers for light incident at 9.9° in the 1.45 index medium at the wavelength of 862 nanometers. Prefixes indicate multiple quarter-wave layers; superscripts indicate repeated layers or groups of layer, and H' and L' are fractional layers with H'=0.398H and L'=0.192L. The high and low index layers are composed of tantalum and silicon oxides, respectively, with refractive indices of approximately 2.14 and 1.45 in the relevant spectral region. The glass block has a refractive index of 1.45 at the wavelength of 862 nanometers and may, for example, be composed of fused silica. Two half-wedge blocks, each having a wedge angle of 1.55° are assembled together to produce a wedge-shaped optical block having a wedge angle of 3.1°. The incident light beam, comprising multiple optical channels, enters the glass block at an angle of 14.4° (θ) and is refracted to a smaller angle inside the block to be incident on the opposite surface at an angle of 9.9° ($\theta_1$). In this design, because the wedge angle has doubled, the incident angles upon the wavelength-selective filters, 30 and 30', at the surfaces, 22 and 24, are the same as in the previous example, i.e., angle $\theta_2$ is 13.0° (9.9+3.1), angle $\theta_3$ is 16.1° and angle $\theta_4$ is 19.2°, Accordingly, the described design achieves excellent separation of four channels having center wavelengths of 862, 853.5, 842.7, and 829.8 nanometers, just as in the previous design.

Figure 4:
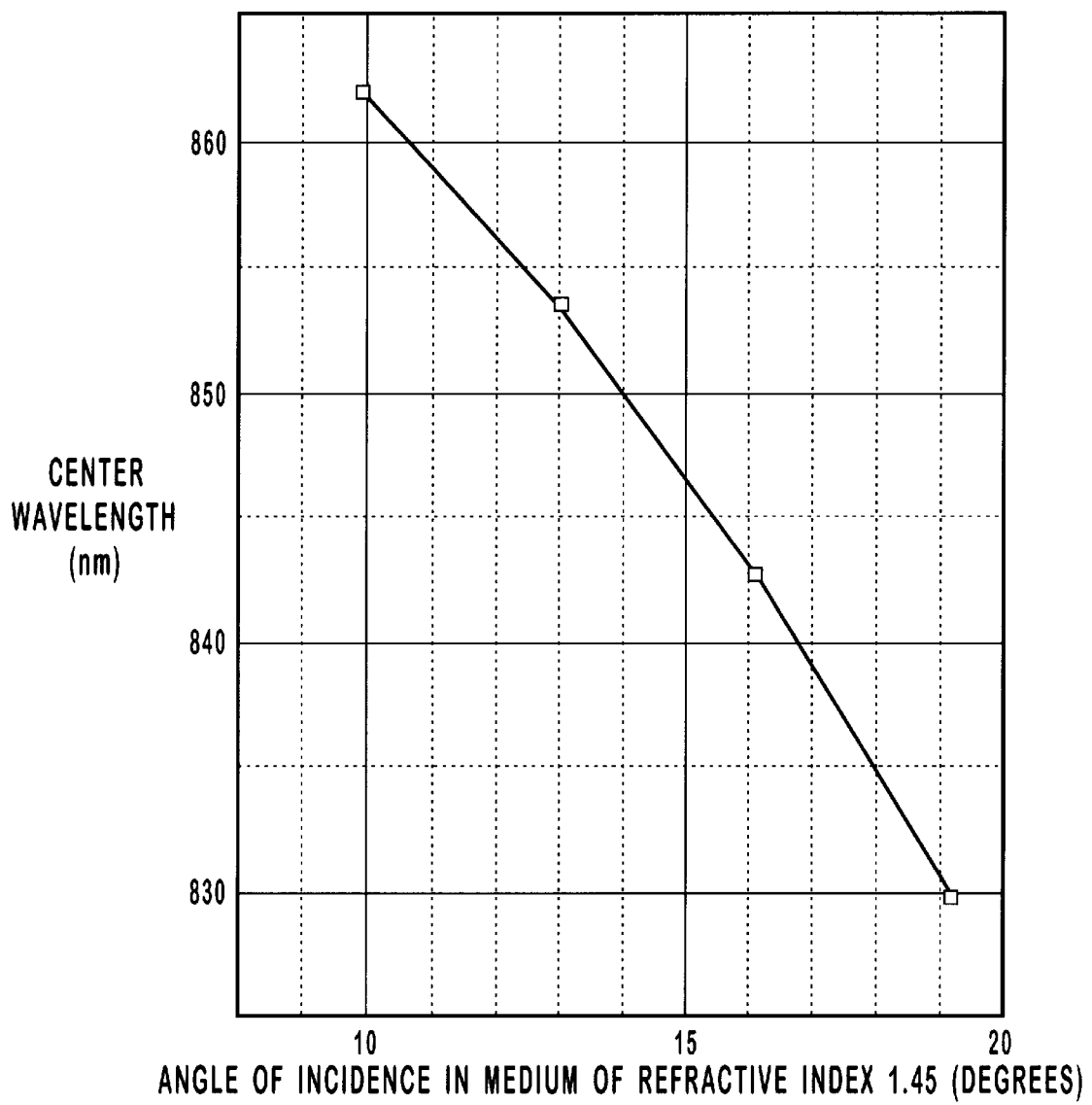
FIG. 4 is a graph of the center wavelengths as a function of light incident angle in a medium of refractive index 1.45 upon a particular NBP filter utilized in a preferred embodiment of the present invention.

FIG. 4 is a graph of the center wavelengths as a function of incident angle of the particular NBP filter utilized in accord with the above-described exemplary embodiments of the present invention as shown in FIGS. 1 and 3. Although the data points representing the four channels are not linearly related, the curve has only slight curvature and the channel separations are approximately uniform.

Figure 5:
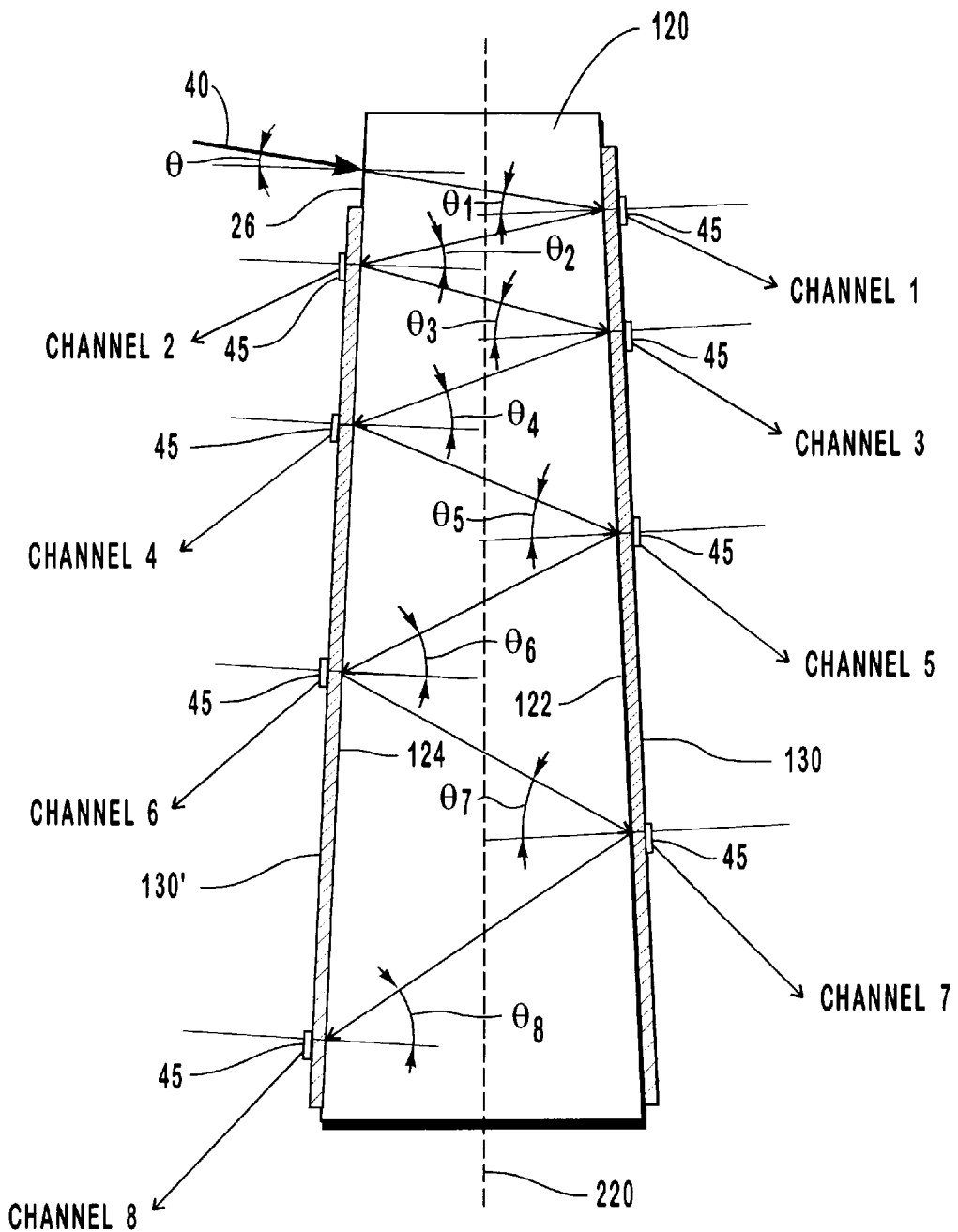
FIG. 5 is a schematic cross-section illustration of another alternative embodiment of an optical multiplexing/demultiplexing device in accord with the present invention having the capability of multiplexing/demultiplexing eight optical channels.

FIG. 5 is a schematic cross-section illustration of another alternative embodiment of an optical multiplexing/demultiplexing device in accord with the present invention having the capability of multiplexing/demultiplexing eight optical channels. This device is very similar to the device shown in FIG. 3. A wedge-shaped optical block 120 provides the multiple-reflection chamber for multiply reflecting a light beam. Each surface, 122 and 124, of the optical block is optically aligned with a single, continuous, wavelength-selective optical filter, 130 and 130', respectively except for a small area on surface 124 that serves as a multiple-channel propagation port 26 for an incident light beam 40 to be demultiplexed. Again, each of the continuous, wavelength-selective optical filters may be deposited directly upon the surface of the optical block or may be deposited upon a substrate that is subsequently affixed to the surface of the optical block in an optically continuous manner. Alternatively, two half-wedge blocks could be simultaneously coated with identical continuous, wavelength-selective optical filters and then assembled together to form the optical block 120 as indicated by the dotted line 220 through the center of the optical block 120. In the illustrated embodiment of FIG. 5, multiplexing/demultiplexing occurs on each surface 122 and 124. Each sequentially reflected light beam strikes the wavelength-selective filters, 130 and 130', at a different incident angle, $\theta_1$, $\theta_2$, $\theta_3$, $\theta_4$, $\theta_5$, $\theta_6$, $\theta_7$, and $\theta_8$, respectively. Because the continuous wavelength-selective optical filters are transparent to a different center wavelength depending on the angle of incidence of the light beam, a different particular wavelength is transmitted through a plurality of separate selected-channel propagation ports 45 optically aligned with the filters at each location where a differently angled light beam is incident.

A particular exemplary embodiment in accord with FIG. 5 utilizes a solid glass wedge-shaped optical block for the multiple-reflection chamber. The incident medium in this example is air having a refractive index of unity. The NBP filters are each a 119-layer, 5-cavity design depicted as follows: $(HL)^6$ 2H 4L 2H $(LH)^6$ L $(HL)^7$ 2H 4L 2H $(LH)^7$ L $(HL)^7$ 2H 4L 2H $(LH)^7$ L $(HL)^6$ 2H 4L 2H $(LH)^6$, where H and L represent quarter wavelength optically thick layers of the high and low index layers for light incident at 5.1° in the 1.45 index medium at the wavelength of 1.55 μm (micrometers). Prefixes indicate multiple quarter-wave layers and superscripts indicate repeated layers or groups of layers. The high and low index layers are composed of tantalum and silicon oxides, respectively, with refractive indices of approximately 2.09 and 1.45 in the relevant spectral region. The glass block has a refractive index of 1.45 at the wavelength of 1.55 μm. The wedge-shaped optical block has a wedge angle of 1.1°. The incident light beam, comprising multiple optical channels, enters the glass block at an angle of 5.8° ($\theta$) and is refracted to a smaller angle inside the block to be incident on the opposite surface at an angle of 5.1° ($\theta_1$). In this design, the subsequent incident angles upon the wavelength-selective filters, 130 and 130', at the surfaces, 122 and 124, are as follows: angle $\theta_2$ is 6.2° (5.1+1.1); angle $\theta_3$ is 7.3°; angle $\theta_4$ is 8.4°; angle $\theta_5$ is 9.5°; angle $\theta_6$ is 10.6° angle $\theta_7$ is 11.7°; and, angle $\theta_8$ is 12.8°.

Figure 6:
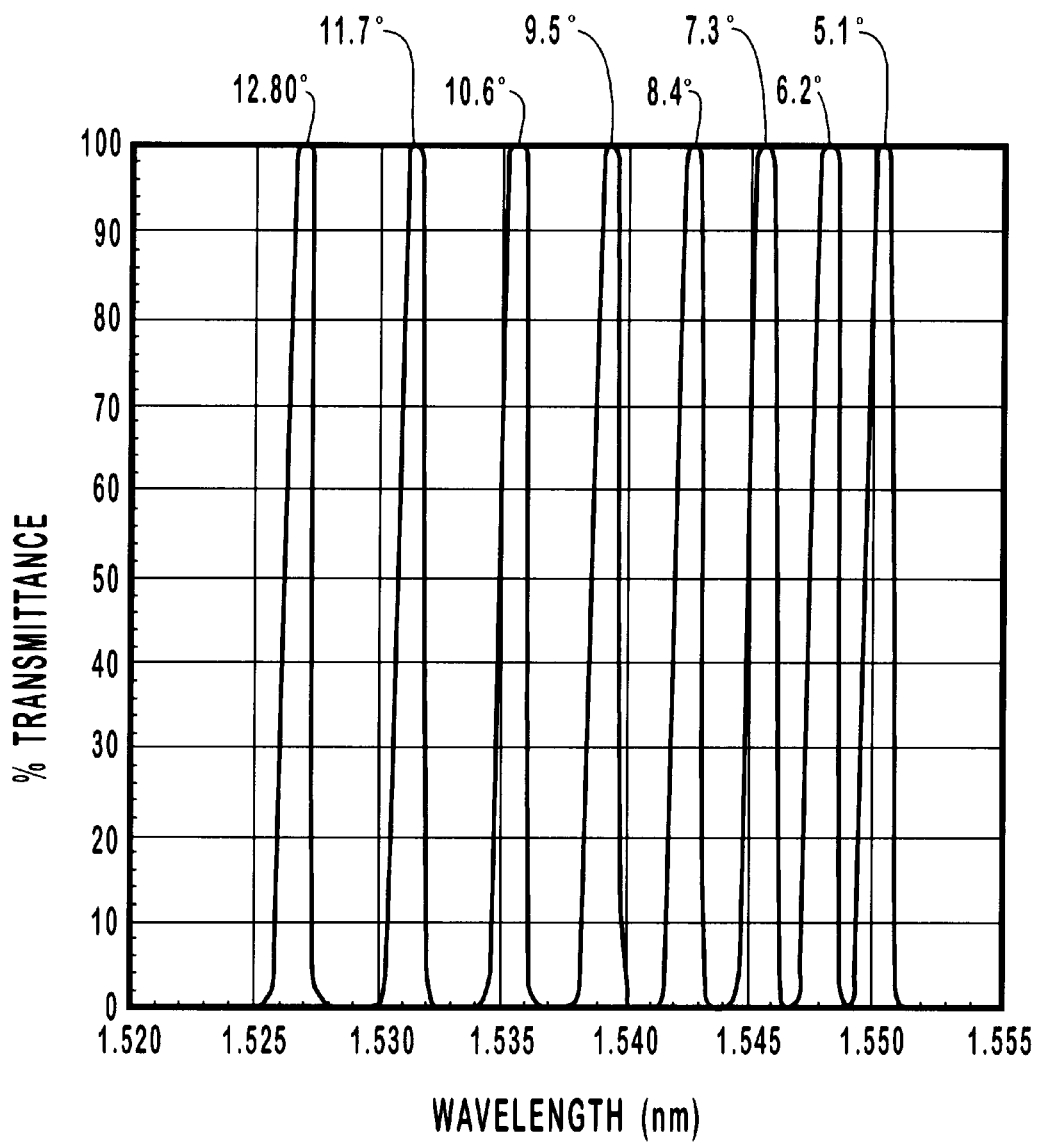
FIG. 6 is a graph of the spectral transmittance of a particular NBP filter for light at different incident angles in a medium of refractive index 1.55 in accord with a preferred embodiment of the present invention as shown in FIG. 5.

FIG. 6 is a graph of the spectral transmittance of the above-described NBP filter for light incident angles in accord with a preferred embodiment of the present invention as shown in FIG. 5 having the above-described parameters. The two continuous NBP filters provide excellent separation of eight channels having center wavelengths of 1.55, 1.5479, 1.5453, 1.5424, 1.5391, 1.5353 1.5312, and 1.5266 μm.

Figure 7:
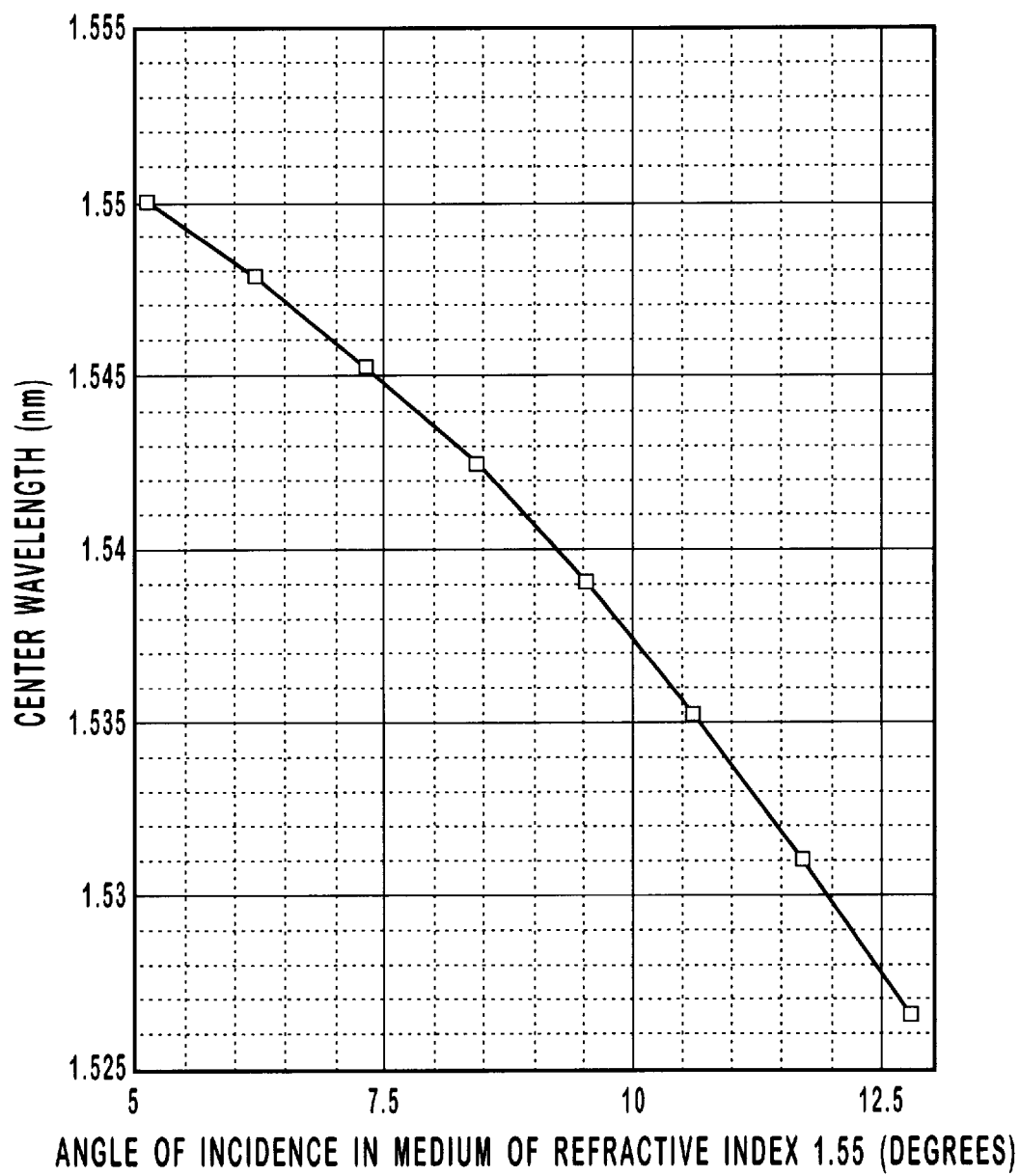
FIG. 7 is a graph of the center wavelengths as a function of light incident angle in a medium of refractive index 1.55 upon a particular NBP filter utilized in a preferred embodiment of the present invention.

FIG. 7 is a graph of the center wavelengths as a function of incident angle of the particular NBP filter utilized in accord with the above-described exemplary embodiment of the present invention as shown in FIG. 5.

Figure 8:
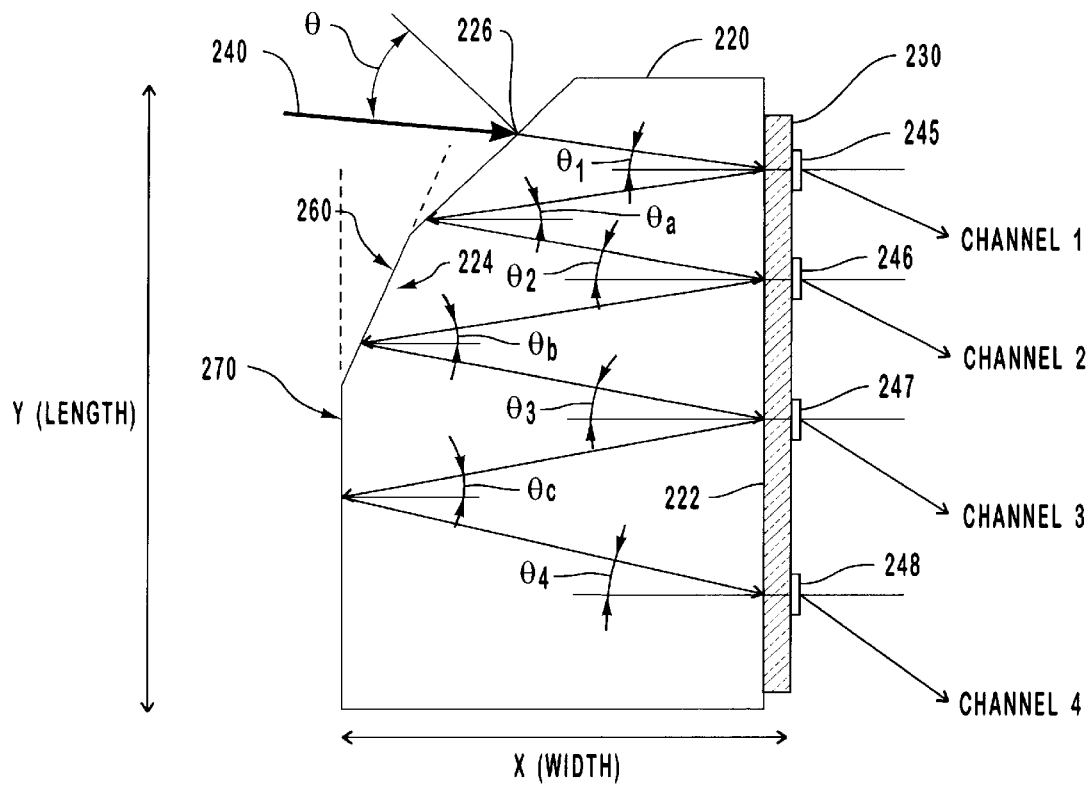
FIG. 8 is a schematic cross-section illustration of a second preferred embodiment of an optical multiplexing/demultiplexing device in accord with the present invention having the capability of multiplexing/demultiplexing four optical channels.

Turning now to the second exemplary embodiment of the present invention, a schematic cross-section illustration of a second preferred embodiment of an optical multiplexing/demultiplexing device in accord with the present invention having the capability of multiplexing/demultiplexing four optical channels is shown in FIG. 8. In this second preferred embodiment, a multiple-reflection chamber comprising a substantially parallel-sided optical block 220 having wedged facets, 260 and 270, formed on a light-interacting surface 224. It will be appreciated that the wedged facets may be large with respect to the breadth of the propagating beam so as to perform as prisms or the wedged facets may be small with respect to the breadth of the propagating beam such that a diffractive effect is utilized. In the illustrated embodiment, each wedged facet is a miniature prism to direct the reflected light beam. It will be further appreciated that the wedged facets may be formed on the surface 224 or may be formed separately and affixed in an optically continuous manner to the surface 224. It will also be appreciated that, due to the wedged facets, optical block also has a varying width, i.e., thickness, "X" along its length "Y."

A continuous, wavelength-selective optical filter 230 is optically aligned with one surface 222 of the optical block. The continuous, wavelength-selective optical filter 230 may be deposited directly upon the surface of the optical block or may be deposited upon a substrate that is subsequently affixed to the surface of the optical block in an optically continuous manner. The opposite surface 224 of the optical block 220 is preferably optically aligned with a reflective coating (not shown) except for a small area that serves as the multiple-channel propagation port 226 for an incident light beam 240 to be demultiplexed. (In demultiplexing mode, this port is the input port while, in a multiplexing mode, this port would be the output port for the multiplexed channels.)

In the illustrated embodiment of FIG. 8, all multiplexing/demultiplexing occurs on the surface 222 optically aligned with the wavelength-selective filter 230. In all of the Figures, an arrow or arrows indicate the pathway of the light beam in the demultiplexing mode of operation of the device. The angle $\theta$ of the incident light beam is a function of the material of the optical block and the angle of entry from the optical source such as an optical fiber. Because of the wedged facets on the surface 224 of the optical block, each sequentially reflected light beam strikes the wavelength-selective filter 230 at a different incident angle, $\theta_1$, $\theta_2$, $\theta_3$, and $\theta_4$, respectively. The light beam is sequentially reflected from the reflective coating on surface 224 at the different incident angles, $\theta_a$, $\theta_b$, and $\theta_c$. Thus, the wedged facets result in a continuously varying bounce angle of the multiply reflected light beam traversing the optical block. The particular bounce angle is determined by factors unrelated to the NBP filter and, thus, is more easily and reliably controlled than factors related to the alignment and thickness of the NBP filter itself. In particular, the continuously variable bounce angle has two components: a constant component determined by the angle of incidence of the inputted light and the material of the optical block; and, a variable additive component determined by the wedge angle of each facet. Because the continuous wavelength-selective optical filter 230 is transparent to a different center wavelength depending on the angle of incidence of the light beam, a different particular wavelength is transmitted through a plurality of separate selected-channel propagation ports, 245, 246, 247 and 248, optically aligned with the filter at each location where a differently angled light beam is incident. In this manner, multiple optical channels are multiplexed/demultiplexed through the single, constant NBP filter.

A particular exemplary embodiment in accord with FIG. 8 utilizes a solid glass optical block having two wedged facets formed on one surface for the multiple-reflection chamber. The relationships between the incident angle and the exit angle of the transmitted wavelength is determined by Snell's law and is a function of the refractive indices of the interfacing materials. The incident medium in this example is air having a refractive index of unity. The NBP filter is the 67-layer, 5-cavity design depicted as follows: H' L' H' $(LH)^2$ 14L $(HL)^5$ H 14L $(HL)^6$ H 14L $(HL)^6$ H 14L $(HL)^5$ H 14L $(HL)^2$ H' L' H', where H and L represent quarter wavelength optically thick layers of the high and low index layers for light incident at 5.0° in the 1.45 index medium at the wavelength of 862 nanometers. Prefixes indicate multiple quarter-wave layers; superscripts indicate repeated layers or groups of layer, and H' and L' are fractional layers with H'=0.398H and L'=0.192L. The high and low index layers are composed of tantalum and silicon oxides, respectively, with refractive indices of approximately 2.14 and 1.45 in the relevant spectral region. The glass block has a refractive index of 1.45 at the wavelength of 862 nanometers and may, for example, be composed of fused silica. The initial prism angle at the multiple-channel propagation port 226 is 2.72°; the wedged facet 260 has an angle of 0.985° less than the initial prism surface, resulting in a prism angle of 1.735°. The wedged facet 270 has an angle of 0.35° less than the wedged facet 260, resulting in a prism angle of 1.385°. The incident light beam 240, comprising multiple optical channels, enters the glass block at an angle of 7.26° ($\theta$) and is refracted to a smaller angle inside the block to be incident on the opposite surface at an angle of 5.0° ($\theta_1$). At the first selected channel propagation port 245, light having a wavelength of 862 nm is transmitted and the remaining light is reflected to impinge surface 224 on the initial prism at an incident angle of (5.0+2.72) 7.72° ($\theta_a$) The light beam is reflected to impinge surface 222 at the location of the second selected channel propagation port 246 at an incident angle of (7.72+2.72) 10.44° ($\theta_2$) where light having a wavelength of 852 nm is transmitted and the remaining light is reflected to impinge surface 224 at the location of the wedged facet 260 at an incident angle of (10.44+1.735) 12.175° ($\theta_b$). (This incident angle has been varied by the prism angle of 1.735° of wedged facet 260.) The light beam is reflected to impinge surface 222 at the location of the third selected channel propagation port 247 at an incident angle of (12.175+1.735) 13.91° ($\theta_3$) (this incident angle has been varied by the prism angle of 1.735° of wedged facet 260) where light having a wavelength of 842 nm is transmitted and the remaining light is reflected to impinge surface 224 at an incident angle of (13.91+1.385) 15.295° ($\theta_c$). (This incident angle has been varied by the prism angle of 1.385° of wedged facet 270.) The light beam is reflected to impinge surface 222 at the location of the fourth selected channel propagation port 248 at an incident angle of (15.295+1.385) 16.68° ($\theta_4$) (this incident angle has been varied by the prism angle of 1.385° of wedged facet 270) where light having a wavelength of 832 nm is transmitted. Accordingly, the described design achieves excellent separation of four channels by achieving successively varied angles of incidence upon the single continuous NBP filter 230.

Figure 9:
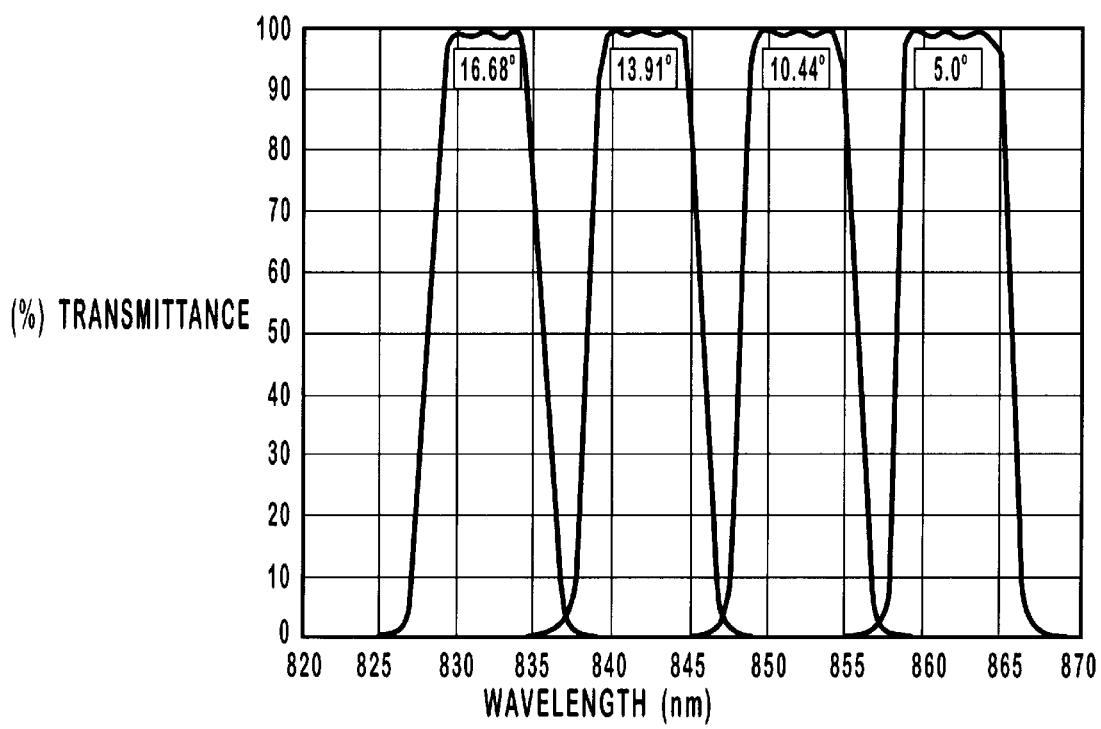
FIG. 9 is a graph of the spectral transmittance of a particular NBP filter for light at different incident angles in a medium of refractive index 1.45 in accord with a preferred embodiment of the present invention as shown in FIG. 8.

FIG. 9 is a graph of the spectral transmittance of the above-described NBP filter for light incident angles in accord with a preferred embodiment of the present invention as shown in FIG. 8 having the above-described parameters. The single, continuous NBP filter provides excellent separation of four channels having center wavelengths of 862, 852, 842, and 832 nanometers.

Although the descriptions have focused on the demultiplexing mode of operation, persons of skill in the art will appreciate that the multiplexing mode of operation is achieved by reversing the direction of the arrows in the Figures. Persons of skill in the art will further understand that the optical connections, i.e., the light source(s), couplers, collimating and/or other lenses, detectors and/or other receivers, are included in a communication system comprising the MUX/DEMUX devices as disclosed herein. Typically, the input and output light beams are conveyed in optical fibers which are connected to the MUX/DEMUX device via GRIN lenses selected to refract light from a fiber end to a parallel beam or to focus a parallel beam of light onto the end of a fiber.

Figure 10:
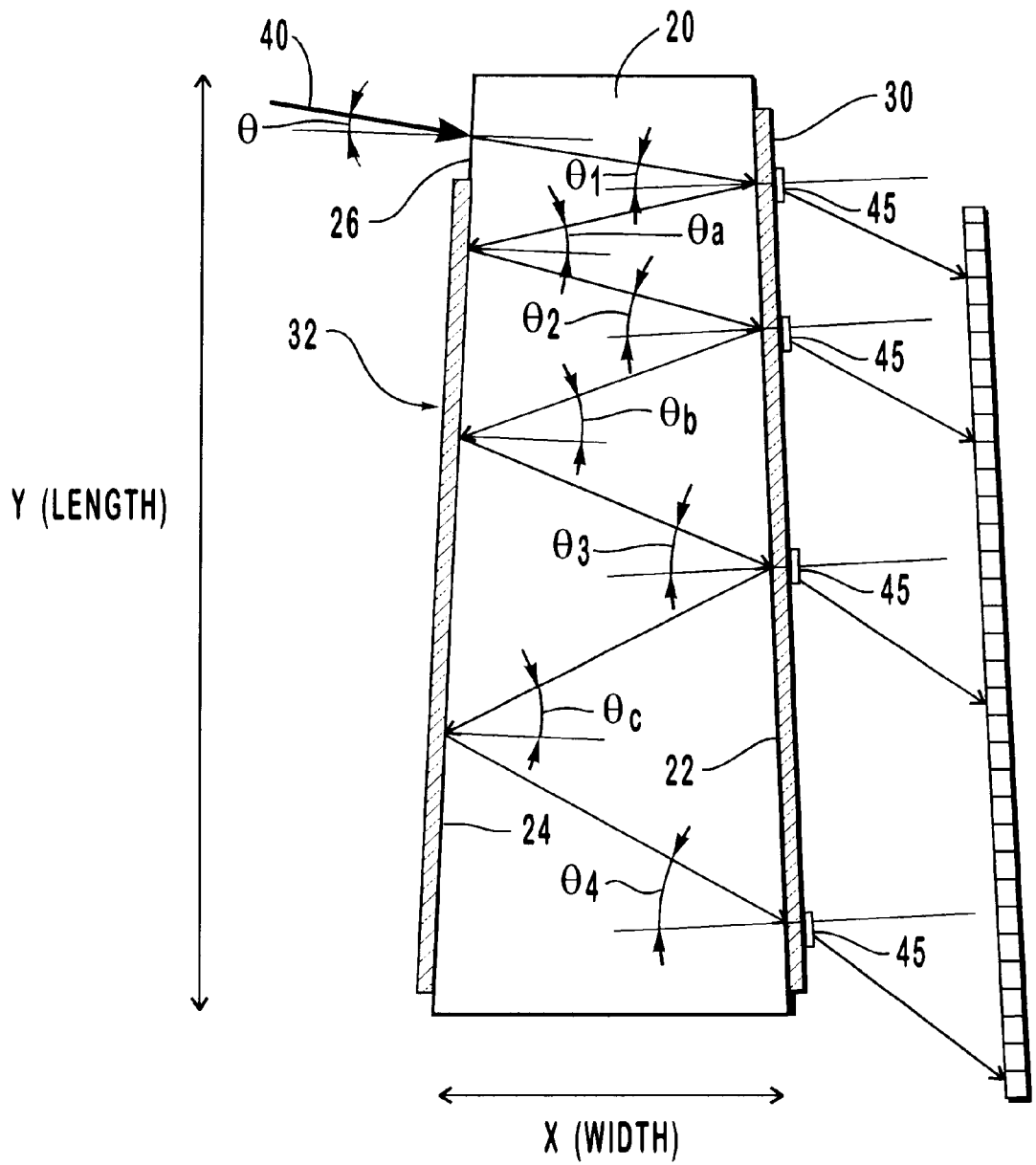
FIG. 10 is a schematic cross-section illustration of the first preferred embodiment of an optical multiplexing/demultiplexing device in accord with the present invention shown in FIG. 1 having a photodetector array aligned to receive the outputted light.

In addition, because of the much simpler design wherein multiple channels may be multiplexed/demultiplexed through a single, continuous, wavelength-selective optical filter, other components and the alignment, connecting, and calibrating thereof, is also greatly simplified. For example, having a photodetector of the linear array type in which individual photosensitive elements may be electronically addressed could be aligned with the wavelength-selective filter such that the separate wavelength channels would illuminate specific elements on the photodetector. In the case of a demultiplexer used for the 800 nanometer wavelength region, the photodetector could be, for example, a 256-element silicon array. Calibration, re-calibration, and electrical signal monitoring and processing could be carried out with a digital computer connection to the photodetector array. The photodetector elements which are aligned to the channels may be selected through a calibration process after which only those elements are needed in the demultiplexer. Should the input incident angle change or some mechanical realignment occur in the device, re-calibration could select a different group of individual photodetector elements. FIG. 10 is a schematic cross-section illustration of the first preferred embodiment of an optical multiplexing/demultiplexing device in accord with the present invention shown in FIG. 1 (and using the same reference numbers for identical elements) aligned with a photodetector array 50 for receiving the outputted light.

Persons of skill in the art will appreciate that it would be possible to enhance the optical performance of the device by changing the surface configuration and properties of the optical block. For example, selected lens surfaces could be incorporated into the design at the ports for multiplexing/demultiplexing light. The lenses could be, for example, formed of molded plastic and have a lens that minimizes divergence of the reflected light. Such lenses could be positioned at one or more of the intermediary bounce positions and/or at the last reflection point.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A multiple channel optical multiplexing/demultiplexing device comprising:
   (a) a wavelength-selective interference filter;
   (b) a wedge-shaped optical block adapted to direct light at successively different incident angles onto said wavelength-selective interference filter, said wavelength-selective interference filter being transparent to a different wavelength sub-range of light at each different incident angle;
   (c) a multiple-channel propagation port optically aligned with said optical block and selectively positioned in relation to said wavelength-selective interference filter for propagating multiple wavelength light through said multiple channel optical multiplexing/demultiplexing device; and
   (d) a plurality of selected-channel propagation ports optically aligned with said optical block and selectively positioned in relation to said wavelength-selective interference filter for propagating different wavelength sub-ranges of light through said multiple channel optical multiplexing/demultiplexing device.

2. The multiple channel optical multiplexing/demultiplexing device described in claim 1 wherein said wavelength-selective interference filter is a multi-cavity dielectric narrow bandpass filter.

3. The multiple channel optical multiplexing/demultiplexing device described in claim 2 wherein said wedge-shaped optical block comprises a mutliple-reflection chamber adapted to reflect light at successively different angles of incidence upon said multi-cavity dielectric narrow bandpass filter.

4. The multiple channel optical multiplexing/demultiplexing device described in claim 2 wherein said multi-cavity dielectric narrow bandpass filter is optically aligned with a first surface of said wedge-shaped optical block and a second and opposite surface of said wedge-shaped optical block is optically aligned with a reflective filter.

5. The multiple channel optical multiplexing/demultiplexing device described in claim 2 wherein said multi-cavity dielectric narrow bandpass filter is optically aligned with a first surface of said wedge-shaped optical block and another multi-cavity dielectric narrow bandpass filter is optically aligned with a second and opposite surface of said wedge-shaped optical block.

6. The multi-channel optical multiplexing/demultiplexing device described in claim 1 wherein said optical block is a single solid wedge-shaped block.

7. The multiple channel optical multiplexing/demultiplexing device described in claim 1 wherein said optical block comprises a wedge-shaped enclosed chamber which is hollow.

8. A multiple channel optical multiplexing/demultiplexing device comprising:

(a) a wavelength-selective interference filter;

(b) a multi-reflection wedge-shaped optical block having a first surface optically aligned with said wavelength-selective interference filter and having a second and opposite surface adapted to reflect light at successively different incident angles onto said wavelength-selective interference filter, said wavelength-selective interference filter being transparent to a different wavelength sub-range of light at each different incident angle;

(c) a multiple-channel propagation port optically aligned with said second and opposite surface of said optical block and selectively positioned in relation to the wavelength-selective interference filter for propagating multiple wavelength light through said multiple channel optical multiplexing/demultiplexing device; and (d) a plurality of selected-channel propagation ports optically aligned with said first surface of said optical block and selectively positioned in relation to the wavelength-selective interference filter for propagating different wavelength subranges of light through said multiple channel optical multiplexing/demultiplexing device.

9. The multiple channel optical multiplexing/demultiplexing device described in claim 8 wherein said optical block is a single solid wedge-shaped block.

10. The multiple channel optical multiplexing/demultiplexing device described in claim 8 wherein said wavelength-selective interference filter is a multi-cavity dielectric narrow bandpass filter.

11. The multiple channel optical multiplexing/demultiplexing device described in claim 10, wherein said multi-cavity dielectric narrow bandpass filter comprises a film stack formed of alternating thin film layers of high refractive index material selected from the group consisting of niobium pentoxide, titanium dioxide, tantalum pentoxide and mixtures thereof and thin film layers of low refractive index silica material.

12. The multiple channel optical multiplexing/demultiplexing device described in claim 11 wherein said multi-cavity dielectric narrow bandpass filter is deposited directly on said first surface of said wedge-shaped optical block.

13. The multiple channel optical multiplexing/demultiplexing device described in claim 10 wherein another multi-cavity dielectric narrow bandpass filter is optically aligned with said second and opposite surface of said wedge-shaped optical block.

14. The multiple channel optical multiplexing/demultiplexing device described in claim 13 wherein each multi-cavity dielectric narrow bandpass filter has the same design and are simultaneously deposited directly on two surfaces of component blocks for assembly into said wedge-shaped optical block.

15. The multiple channel multiplexing/demultiplexing device described in claim 8 wherein said second and opposite surface of said wedge-shaped optical block is optically aligned with a reflective filter.

16. The multiple channel optical multiplexing/demultiplexing device described in claim 8 wherein said optical block comprises a wedge-shaped enclosed chamber which is hollow.

17. A multiple channel optical multiplexing/demultiplexing device comprising:

(a) a multi-reflection optical block having a first surface and a second surface, the second surface being substantially parallel to a first portion of the first surface, with a second portion of the first surface including one or more facets that are angularly oriented with respect to the second surface;

(b) a wavelength-selective interference filter on the second surface, said wavelength-selective interference filter being transparent to different wavelength sub-ranges of light directed thereto at different incident angles;

(c) a multiple-channel propagation port optically aligned with said optical block and selectively positioned in relation to said wavelength-selective interference filter for propagating multiple wavelength light through the multiple channel optical multiplexing/demultiplexing device; and (d) a plurality of selected-channel propagation ports optically aligned with said optical block;

wherein said optical block is adapted to reflect light at successively different incident angles upon said wavelength-selective interference filter.

18. The multiple channel optical multiplexing/demultiplexing device described in claim 17 wherein said wavelength-selective interference filter is a multi-cavity dielectric narrow bandpass filter.

19. The multiple channel optical multiplexing/demultiplexing device described in claim 18 wherein said multi-cavity dielectric narrow bandpass filter is optically aligned with said second surface of said optical block and a reflective filter is optically aligned with said first surface.

20. The multiple channel optical multiplexing/demultiplexing device as described in claim 17 wherein said optical block is composed of solid glass and has two wedged facets on the second portions of the first surface.

* * * * *